United States Patent
Subasingha et al.

(10) Patent No.: US 11,753,042 B1
(45) Date of Patent: Sep. 12, 2023

(54) ACTIVE POWER CONTROL USING NEIGHBORING PIXELS

(71) Applicant: Zoox, Inc., Foster City, CA (US)

(72) Inventors: Subasingha Shaminda Subasingha, San Ramon, CA (US); Yongzhe Chen, San Jose, CA (US); Mehran Ferdowsi, San Mateo, CA (US); Samuel Holladay, San Francisco, CA (US); Turhan Karadeniz, Oakland, CA (US); Robert Nicholas Moor, San Mateo, CA (US); Joseph Patrick Warga, San Francisco, CA (US); Harrison Thomas Waschura, Los Altos Hills, CA (US); Silas Kogure Wilkinson, San Francisco, CA (US)

( * ) Notice: Subject to any disclaimer, the term of this patent is extended or adjusted under 35 U.S.C. 154(b) by 344 days.

(21) Appl. No.: 17/136,222

(22) Filed: Dec. 29, 2020

(51) Int. Cl.
*B60W 60/00* (2020.01)
*G05D 1/02* (2020.01)
*G01S 13/931* (2020.01)

(52) U.S. Cl.
CPC ....... *B60W 60/0027* (2020.02); *G05D 1/0214* (2013.01); *B60W 2554/00* (2020.02); *G01S 13/931* (2013.01); *G01S 2013/9323* (2020.01); *G01S 2013/9324* (2020.01)

(58) Field of Classification Search
None
See application file for complete search history.

(56) References Cited

U.S. PATENT DOCUMENTS

| | | | |
|---|---|---|---|
| 10,915,783 B1* | 2/2021 | Hallman | G06V 10/82 |
| 2006/0176467 A1* | 8/2006 | Rafii | G01C 3/08 |
| | | | 356/5.01 |
| 2020/0219276 A1* | 7/2020 | Bleyer | G06T 7/0002 |
| 2022/0128701 A1* | 4/2022 | Alghanem | G01S 17/89 |

\* cited by examiner

*Primary Examiner* — James J Lee
*Assistant Examiner* — David Hatch
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Sensor data generated by the time-of-flight sensor can include saturated pixels, e.g., due to over-exposure, sensing highly-reflective objects, and/or excessive ambient light. In some examples, parameters associated with power of a time-of-flight sensor can be altered based on characteristics of the saturated pixels, as well as information about non-saturated pixels neighboring the saturated pixels. For example, the neighboring pixels may provide information about whether saturation is due to ambient light, e.g., sunlight, or due to emitted light from the sensor.

20 Claims, 5 Drawing Sheets

US 11,753,042 B1

ACTIVE POWER CONTROL USING NEIGHBORING PIXELS

BACKGROUND

Time-of-flight sensors may be unreliable in certain environments, including environments with varied lighting and/or environments containing objects with different reflective and absorptive properties. For instance, reflections off objects that are extremely close to the sensor, reflections off objects that have high reflectivity, and/or other high-illumination situations can result in unreliable pixel data. Unreliable pixel data may result in increased processing time to better understand the data and/or decreased efficiency in identifying and/or characterizing objects in the data. Worse, such high reflectivity may cause saturation, making it impossible to infer any information about the scene. When the time-of-flight sensor is intended for use on an autonomous vehicle, unreliable data can be a hindrance to identifying and/or characterizing potential obstacles to travel, thereby reducing safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
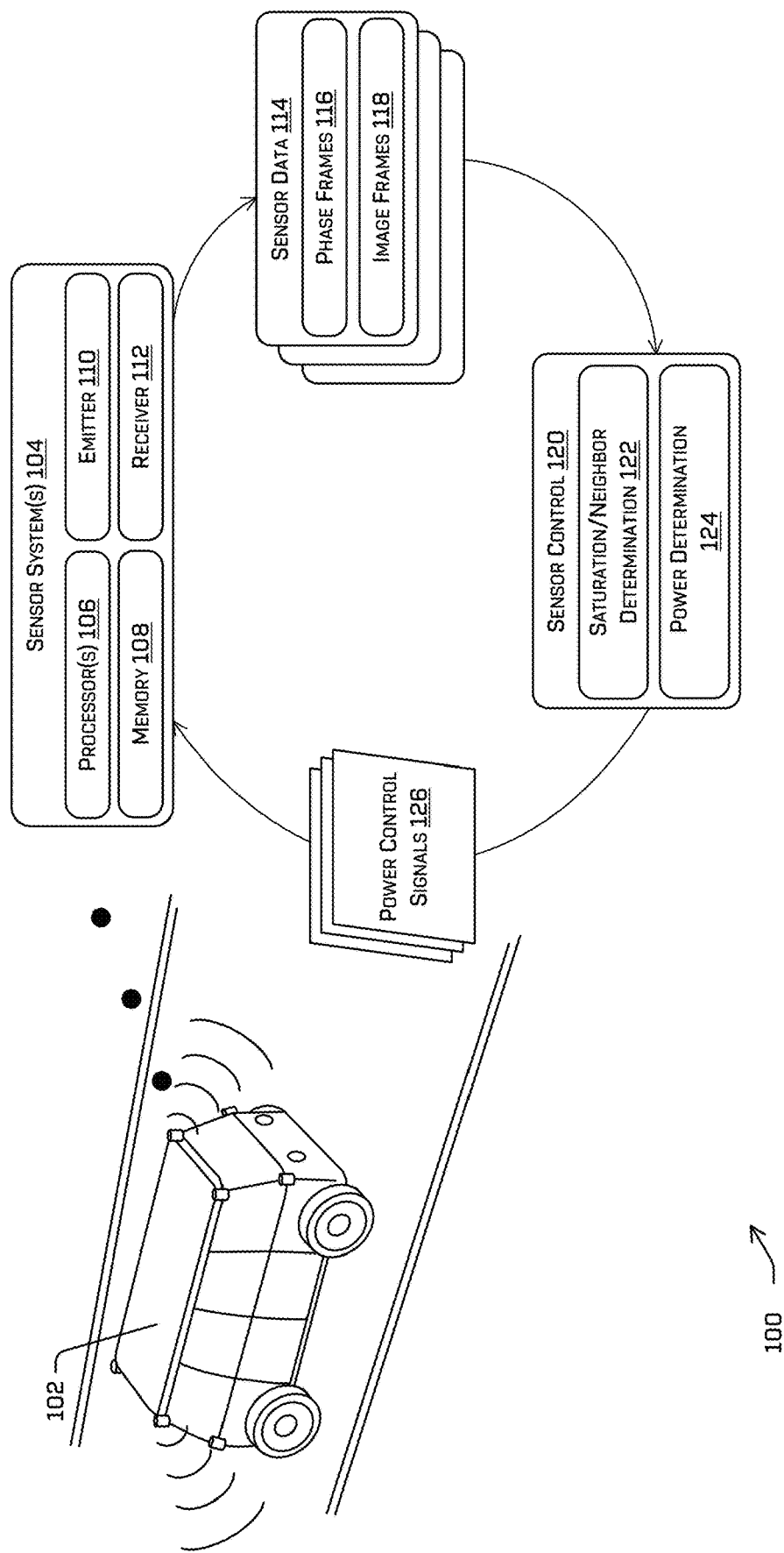
FIG. 1 is a schematic illustration showing an example vehicle, such as an autonomous vehicle, and example components and functionality of a sensor system associated with the vehicle, as described herein.

This disclosure describes methods, apparatuses, and systems for generating sensor data that can be used to identify objects in an environment and to control a vehicle relative to those identified objects. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for robustness purposes and/or because of inherent shortcomings in the sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances intensity and distance information generated by time-of-flight sensors may be unreliable due to one or more of oversaturation, glare caused by highly reflective objects, pixel noise from stray light, under exposure, ambiguous returns, or the like. Techniques described herein can be used to improve sensor data, including time-of-flight sensor returns. For example, techniques disclosed herein may actively control illumination and sensing parameters based on pixel information to provide improved sensor returns. Improved sensor data may result in a better understanding of the environment of the sensor, and, when the sensor is associated with a vehicle, techniques described herein can lead to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a sensor to sense a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, a sensor, a sensor computing device, and/or another computing system in communication with the sensor can generate controls to actively change sensing parameters, e.g., illumination power/intensity and/or integration time, based on sensed data. As a result, the sensor may be adjusted depending upon attributes of a sensed environment, thereby providing a more reliable dataset. As described above, many factors, such as saturation, underexposure, stray light, and the like, can degrade sensor data quality. Actively controlling sensor parameters may minimize these factors. For instance, and without limitation, decreasing an illumination power and/or decreasing an exposure time can reduce the amount of reflected light received at the sensor, which may reduce a number of saturated pixels and/or otherwise unreliable data.

In some examples, systems and techniques described herein for actively controlling a sensor to improve sensed data can include receiving image data from a sensor, such as a time-of-flight sensor. For example, the time-of-flight sensor may generate raw data, e.g., as phase frames or phase values, corresponding directly to a received (reflected) carrier signal, and/or processed data based on the raw data, e.g., image data including intensity information, depth information and the like. In examples, the intensity information may include an intensity image that associate measured intensity values with pixels in the image. The intensity values may be based on the phase values received by the sensor.

In implementations described herein, the sensor and/or the sensor computing device can vary attributes of the sensor and/or processes using the sensor to generate improved sensor data. For example, some implementations can include varying an integration time, e.g., the time over which the return (reflected) signal is received. Increasing the integration time can allow reflected signals to be received for a longer period of time, which can increase fidelity in low-light and/or for objects at a farther distance. In contrast, decreasing the integration time will reduce the time over which the reflected signal is received, which can reduce over-saturation, for example. Also in examples, the power of the illumination source can be changed to achieve similar results. A higher illumination power will increase signal strength (and thereby return signal strength), which can help prevent underexposure, whereas a lower illumination power can limit overexposure and/or saturation.

In some examples, different configurations for the time-of-flight sensor may be determined dynamically, e.g., to prevent oversaturation. Saturation can often result from one of two sources. First, pixels can be saturated due to active illumination, e.g., because they are exposed to too much of the active illumination emitted by the sensor. Alternatively, pixels can be saturated due to ambient sources, such as the sun. Saturation caused by active illumination often results in glare around highly-reflective objects. Specifically, the reflection causes increased intensity at and around the reflective object, but because the glare results from the emitted light, the sensed return carrier has the same frequency as the emitted light. In contrast, saturation due to ambient sources such as the sun do not result in glare because the frequency and/or phase of the light causing saturation at the pixels is not in phase/frequency with the emitted light. By distinguishing between saturation (and glare) caused by active illumination and saturation resulting from ambient light, aspects of this disclosure can better reduce and/or eliminate the number of saturated pixels in subsequent exposures.

Aspects of this disclosure include identifying saturated pixels and neighboring pixels in image data captured by the sensor, and using attributes of those pixels to actively control power at the sensor. In some examples, saturated pixels can be pixels in an intensity image having an intensity above or equal to a threshold intensity, e.g., 1.0. Alternatively, saturated pixels can be identified based on values and/or properties associated with phase values used to generate the intensity image and/or other image data. Once saturated pixels are identified, techniques described herein can identify neighboring pixels as pixels that are horizontally or vertically adjacent (e.g., next to) the saturated pixels, e.g., in an intensity image.

Techniques described herein can also generate an energy metric for the sensor data based on characteristics, attributes, or properties of the saturated pixels and/or the neighboring pixels. As described above, pixels neighboring saturated pixels may have higher energies and/or other properties associated with glare when the saturation is a result of the active illumination. In at least some examples, the energy metric may be based on a number of the saturated pixels and/or a number of the neighboring pixels. For instance, the number of pixels will provide information about the size of the reflector(s). The energy metric may also be based on energy characteristics of the saturated pixels and/or the neighboring pixels. As noted above, the higher the energy of the saturated pixels and/or the neighboring pixels, the more likely the saturation is a result of the active illumination. Other properties and characteristics may also be used to calculate the energy metric.

In some aspects of this disclosure, techniques described herein can include comparing the energy metric to a threshold energy metric, and based on the comparison, generating signals to reconfigure the sensor. For example, if the energy metric meets or exceeds a threshold energy metric, a first control signal may be generated that controls the sensor to reduce an exposure time and/or to reduce an illumination power. Conversely, if the energy metric is below the threshold energy metric, a second control signal may be generated that controls the sensor to increase an exposure time and/or to increase an illumination power. The second control signal may alternatively include an indication to maintain a current configuration of the sensor. By reconfiguring the sensor based on the energy metric, subsequently generated sensor data may have fewer saturated pixels and/or higher fidelity.

In some examples, image data generated using the techniques described herein may be provided to, received by, or otherwise accessed by a computing device of an autonomous vehicle. For instance, the autonomous vehicle may use the image data to determine one or more trajectories for proceeding relative to objects determined from the filtered data. In some instances, depth and/or intensity information identified according to filtering techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to improve sensor data and more accurately determine features of the objects. For example, techniques described herein may be faster and/or more robust than conventional techniques, as they may increase the reliability of depth and/or intensity information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which inconsistent sensor data exists, e.g., caused at least in part by glare, may benefit from the techniques described. By way of non-limiting example, techniques described herein may be used on aircrafts, e.g., to correct intensities and/or depths associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-5 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road marking, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable by the processor(s) 106 to cause the sensor system(s) 104 to perform functions that quantify glare and image data and/or correct the data to remove the impact of the glare, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

The sensor system(s) 104 can also include an emitter 110 and a receiver 112. In the example of FIG. 1, the sensor system(s) 104 may include a time-of-flight sensor, and the emitter 110 may be configured to emit a carrier (e.g., a signal) and the receiver 112 may be configured to receive, e.g., capture, a response carrier (e.g., a response signal). The response carrier may be the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

Aspects of the emitter 110 and/or aspects of the receiver 112 may be configurable. For instance, a modulation frequency and/or an intensity of the carrier emitted by the emitter 110 can be altered. For example, the illumination intensity associated with a carrier emitted by the emitter 110 can be altered by adjusting the voltage and/or frequency input to the emitter 110. Moreover, an integration or exposure time of the receiver 114 may be altered, e.g., by controlling an amount of time over which the receiver 112 collects response carriers. Altering the illumination power and/or the integration time can tune the sensor system(s) 104. For example, higher intensity illumination and/or longer integration times can result in increased performance in relatively lower ambient light environments and/or when the response carrier is from farther away objects and/or objects having lower reflectivity. Lower intensity illumination and/or shorter integration times can result in increased performance in relatively higher ambient light environments and/or when the response carrier is from relatively closer objects and/or objects having higher reflectivity.

As also illustrated in FIG. 1, the sensor system(s) 104 may be configured to output generated data as sensor data 114. For examples, the sensor data 114 can include quadrature values, intensity and depth information, or the like. In the illustrated example, the sensor data 114 can include phase frames 116 and/or image frames 118. As noted above, the emitter 110 emits a carrier and the receiver 112 receives a response carrier. In examples, the carrier may be amplitude-modulated light and the response carrier will have a phase shift relative to the carrier. Upon receipt at the receiver 112, the response carrier includes a phase value. Such values may be included in the phase frames 116. In some examples, the sensor system(s) 104 may compute intensity and/or depth values based at least in part on phase values of a plurality of phase frames, e.g., four instances of the phase frames 116.

The intensity and depth values calculated using the phase frames 116 can be embodied as the image frames 118. The image frames 118 can include a stream of serially-generated (e.g., at a predetermined interval) image frames. Generally, each of the image frames 118 may include the same type of data, e.g., data related to the intensity and depth for each of a plurality of pixels comprising the receiver of the sensor. Specifically, the image frames 118 can include a depth image and an intensity image generated by the sensor system(s) 104 and representative of a portion of the environment 100. Similarly, other instances, e.g., frames, of the image data 118 can include both an intensity image and a depth image representative of the environment 100 at the corresponding sensing time. In addition to including an intensity image and a depth image, the image frames 118 can include additional information, including but not limited to reflectivity information and/or confidence information.

In some examples, the image frames can be generated from one or more exposures. For instance, each of a plurality of exposures may correspond to a different configuration of the sensor system(s) 104, and the multiple exposures can be combined or otherwise blended to provide the image frame 202. In a non-limiting example, the settings can include a first setting having a relatively higher power setting (e.g., a higher illumination power or intensity and/or a longer integration time), e.g., to generate a "high" exposure, and a second setting having a relatively lower power setting (e.g., a lower illumination power/intensity and/or a shorter integration time), e.g., to generate a "low" exposure. Of course, these are example settings only. Additional details about and techniques associated with generating an image frame from multiple exposures are disclosed in U.S. application Ser. No. 16/198,208, filed Nov. 21, 2018, and titled "Intensity and Depth Measurements in Time-of-Flight Sensors," and in U.S. application Ser. No. 16/550,156, filed Aug. 23, 2019, and titled "Active Power Control of Sensors," the entire disclosures of which applications are hereby incorporated by reference in their entirety. As detailed therein, a resolved frame, which may correspond to one of the image frames 118, may include blended intensity determined using multiple exposures (or frames of data) at different integration times and/or different illumination intensities and/or may include disambiguated depths determined using multiple frames of data determined at different modulation frequencies.

As noted above, different attributes of the environment 100 can result in degraded sensor data quality. For instance, ambient light, e.g., sunlight, may have the same or a similar wavelength as illumination light emitted and thus, can be perceived at pixels of the time-of-flight sensor as returns, despite not corresponding to emitted light. In high ambient light conditions, sunlight, in combination with light emitted by the emitter 110 can result in oversaturation of pixels. Moreover, highly reflective objects and/or objects that are extremely close to the sensor can also result in oversaturation of pixels, e.g., regardless of ambient lighting conditions. In addition, time-of-flight sensors may have a relatively short dynamic range, e.g., on the order of only a few meters, and returns off objects outside that dynamic range can be relatively weak, and thus provide inaccurate depth and/or unreliable, and generally low, intensity measurements. Techniques described herein can use the phase frames 116 and/or the image frames 118 to determine settings associated with the emitter 110 and/or the receiver 112, e.g., to reduce the impact of environmental factors, including those just described, on pixel quality. Controlling aspects of the emitter 110 and/or the receiver 112 can provide improved datasets that may better represent the environment and/or may have a higher associated confidence. For example, by eliminating or greatly reducing saturated pixels depth measurements become more reliable.

In at least some examples, aspects of this disclosure distinguish between saturation due to high ambient light, e.g., bright sunlight, and saturation resulting from active illumination being returned from highly-reflective surfaces, e.g., retroreflectors and/or surfaces that are particularly close to the sensor. Reducing an illumination power or an integration time may offset the impact of both the ambient light and the active illumination, e.g., by reducing or eliminating saturation. However, reducing exposure time, illumination power, and/or other power characteristics of the sensor may also result in reduced fidelity. When saturation is caused by ambient light, reducing the sensor power may be less desirable than when saturation is caused by the active illumination. For instance, retroreflectors and other highly reflective objects may be of particular importance to controlling autonomous vehicles, e.g., so the objects can be modeled and avoided, and those objects are more likely to cause greater pixel saturation during active illumination, e.g., because of the glare they generate. Accordingly, aspects described herein may vary sensor configurations differently depending on the reason (or source) of saturation.

As illustrated in FIG. 1, a sensor control system 120 may be configured to receive the sensor data 114 generated by the sensor system(s) 104. In more detail, the sensor control system 120 can include a saturated neighbor determination component 122 and/or a power determination component 124. For clarity, the sensor control system 120 (and its components) are illustrated separate from the sensor system(s) 104. However, portions of the sensor control system 120 may be implemented on the sensor system(s) 104. By way of non-limiting example, the processor(s) 106 may be configured to execute actions associated with the pixel evaluation component 122 and/or the power determination component 124.

The saturation/neighbor determination component 122 may be configured to determine portions of sensor data, e.g., individual pixels, that are saturated, as well as portions of the sensor data, e.g., pixels, that neighbor the saturated pixels. In some examples, the saturated neighbor determination component 122 can include functionality to identify saturated pixels from the sensor data 114. For example, the saturation/neighbor determination component 122 can identify pixels as saturated based on intensity information from the image frames 118. For example, saturated pixels may be pixels that have an associated intensity, e.g., an intensity of 1 or other maximum intensity value of the sensor. In other examples, saturated pixels may be pixels having an intensity above a threshold intensity, e.g., above 0.90, 0.95, or the like.

In some examples, the saturation/neighbor determination component can identify saturated pixels based on the phase frames 116. As noted above, the phase frames 116 can include phase values associated with the response carrier. In some examples, if any of the phase values corresponds to a maximum value, e.g., 1.0 or the like, the corresponding pixel may be identified a saturated pixel. Moreover, the response carrier is expected to have properties or characteristics based on the shape of the carrier. In one example, for any pixel, the phase values associated with four phase frames should add to zero. Moreover, for four consecutively captured phase frames, for each pixel, the sum of (i) the difference between the third and the first phase values and (ii) the difference between the fourth and the second phase values should also equal zero. When the phase values for individual pixels do not conform to these properties, the saturated neighbor determination component can determine the pixel as saturated.

In further examples, the sensor system(s) 104 can be configured to identify pixels that are saturated, e.g., using any of the foregoing techniques. For instance, upon determining the saturated pixels, the sensor system(s) 104 may include one or more flags, notifications, identifications, or the like identifying those pixels in the sensor data 114. In these examples, the saturation/neighbor determination component 122 can determine the saturated pixels based on the determinations made by the sensor system(s) 104, e.g., by adopting the determination(s) made at the sensor system(s) 104.

The saturation/neighbor determination component 122 also determines neighboring pixels. In examples of this disclosure, neighboring pixels may be non-saturated pixels that are adjacent saturated pixels. In some instances, the neighboring pixels may be horizontally-adjacent or vertically-adjacent to a saturated pixel. Without limitation, the saturation/neighbor determination component 122 may, for each of the saturated pixels, determine a union of the neighbors of that pixel that are not saturated. In other examples, pixels diagonally-adjacent to a saturated pixel may be identified as neighboring pixels by the saturation/neighbor determination component 122. Moreover, in some implementations, the neighboring pixels can include pixels within a threshold distance of a saturated pixel. For instance, and without limitation, the saturation/neighbor determination component 122 can, in addition to identifying pixels within one pixel, e.g., adjacent pixels as discussed above, identify pixels that are within two-, three-, or more pixels of a saturated pixel.

In some examples, the saturation/neighbor determination component 122 can also determine a quantity of the saturated pixels and/or of the neighboring pixels. As will be appreciated, time-of-flight sensors can generate images comprising an array of thousands of pixels. After determining whether pixels are saturated, neighboring, or other, the saturation/neighbor determination component 122 can quantify a number of the saturated pixels and/or a number of the neighboring pixels. For example, the number of saturated pixels and/or the number of neighboring pixels may indicate a size of a retroflector or highly-reflective surface. As described further herein, the number of saturated pixels and/or the number of neighboring pixels may be used to determine whether aspects of the emitter 110 and/or the receiver 112 should be adjusted. By way of example and not limitation, when the number of pixels exceeds a threshold number, aspects of the emitter 110 and/or the receiver 112 may be adjusted to reduce the number/ratio. In some non-limiting examples, the presence of saturated pixels may cause an integration time and/or an illumination power to be reduced to obtain subsequent instances of the sensor data 114.

In addition to identifying and/or quantifying the saturated pixels and/or the neighboring pixels, the saturation/neighbor determination component 122 can also determine additional characteristics or information associated with the pixels. In some instances, these characteristics may help to characterize or identify the source of the saturation. By way of non-limiting example, the saturation/neighbor determination component 122 can determine information about an intensity of the pixels identified as unreliable. For example, the intensity for these pixels can be determined from the image frames 118 (e.g., from the intensity image). Also in examples, an energy of the pixels can be determined, an energy of a group of pixels, can be determined e.g., a total energy or average energy of all saturated pixels, of all neighboring pixels, or of some other subset of all the pixels, or an energy of all pixels in the sensor data may be determined.

The power determination component 124 can receive the information generated by the saturation/neighbor determination component 122, e.g., the number of saturated pixels, the number of neighboring pixels, intensity and/or energy attributes of those pixels, and/or intensity and/or energy attributes of all pixels, and determine whether to adjust settings of the sensor system(s) 104. By way of non-limiting example, the power determination component 124 can determine whether to increase power or decrease power at the sensor system(s). As used herein, controlling the power of the sensor system(s) 104 may be done in a number of ways. For example, power may be increased by one or both of controlling the emitter 110 to increase an illumination intensity and/or controlling the receiver 112 to increase an integration (or exposure) time. Conversely, power may be decreased by one or both of controlling the emitter to decrease an illumination intensity and/or controlling the receiver 112 to decrease the integration (or exposure) time.

In at least some examples, the power determination component 124 can determine a metric, e.g., an energy or saturation value or score, from information about the saturated pixels and/or the neighboring pixels, and implement or instruct a power adjustment based on the saturation value. For example, when the energy metric for the image is above a threshold, the power may be decreased, e.g., to reduce the energy by reducing the number of saturated pixels and/or an energy of those pixels. In some examples, when the energy metric is below a threshold, the power may be increased, as detailed further herein. In some examples, the saturation value can be calculated using Equation (1):

$$E = \log 10(1 + E_{avg\_sat} + E_{avg\_neighbor} + 0.01 \times N_{neighbor}) \quad (1)$$

In the equation, E represents the energy metric for the instance of the sensor data 114, $E_{avg\_sat}$ is an average energy of the saturated pixels, e.g., determined by the saturation/neighbor determination component 122, $E_{avg\_neighbor}$ is an average energy of the neighbor pixels, and $N_{neighbor}$ is a number of the neighboring pixels. In examples, an energy associated with a pixel may be the intensity of that pixel, an average of values from the phase frames, e.g., the four phase frames, associated with pixel, or some other value. As will be appreciated, the coefficients in Equation (1) can vary depending on the application and/or desired outcome.

In use, as discussed above, the energy metric may be used to determine whether, and how much, to alter power of the sensor. In examples, the energy metric can be calculated as part of a power control loop, e.g., for each exposure. For instance, when the energy metric, E, is above a threshold, the power may be decreased, whereas when the energy metric is below the threshold, the power may be increased (or remain the same). In one non-limiting example, if the energy metric is greater than 0.1, Equation (2) may be used to determine a decreased exposure time (for a subsequent exposure), and if the energy metric is equal to or less than 0.1, Equation (3) may be used to determine an increased exposure time (for capturing subsequent sensor data):

$$T_{exposure\_1} = T_{exposure\_0} + 25(0.1 - E) \quad (2)$$

$$T_{exposure\_1} = T_{exposure\_0} + 5 \quad (3)$$

In Equations (2) and (3), $T_{exposure\_1}$ is an updated exposure time, e.g., for at least a portion of a next exposure or instance of the sensor data 114, and $T_{exposure\_0}$ is an exposure time associated with the sensor data 114 under consideration. For example, the time may be measured in milliseconds. As shown, Equation (2) can result in relatively rapid decreases in exposure times, whereas the increase provided by Equation (3) is relatively small. In one non-limiting example, and as discussed above, an instance of the image frames 118 can be generated from a plurality of exposures, including at least one "high" exposure and at least one "low" exposure. The change in exposure time determined using the Equations (2) and (3) may apply to only the "low" exposure(s) in some examples. Stated differently, $T_{exposure\_1}$ and $T_{exposure\_0}$ may apply only to the "low" exposure(s) used to generate the image frames 118. In other examples, the change may also or alternatively be implemented for the "high" exposure.

Conceptually, the Equations (2) and (3) may provide relatively larger exposure time reductions to more quickly provide returns with fewer saturated pixels. As described herein, sensor data with fewer saturated pixels may be important to properly identify and/or model objects in an environment of the sensor. Once fewer saturated pixels is achieved, increases in the exposure time may be relatively smaller, e.g., to incrementally increase fidelity of the sensor data without a large increase in saturated pixels. As will be appreciated, the energy metric threshold of 0.1 is for example only; a higher or lower threshold may be used. Similarly, the Equations (2) and (3) are for example only; other coefficients may be used, e.g., to provide greater or smaller increases/decreases. In at least some examples, any of the Equations (1), (2), (3), and/or the energy metric threshold may be modified to obtain an energy metric corresponding to no saturated pixels, e.g., 0 in Equation (1).

As illustrated, Equation (1) uses each of the energy of saturated pixels, the energy of neighboring pixels, and the number of neighboring pixels to determine the energy metric for the sensor data, e.g., an instance of the sensor data. In other examples, the power determination component 124 can use other and/or additional characteristics and/or properties. For instance, information from additional (e.g., previous) exposures may be considered. Without limitation, the energy of saturated pixels associated with one or more previous instances of the image frames 118 (or of one or more exposures associated with the one or more previous instances of the image frames 118) may be considered. In other examples, an energy of neighboring pixels from a previous instance of the image frames 118 may also or additionally be considered to determine the energy metric. Also in examples, the power determination component 124 can determine and/or consider a ratio of energies between different exposures, e.g., the "high" exposure and the "low" exposure discussed above to determine the energy metric. Other factors can include energy of pixels in a "low" exposure that are saturated in the corresponding "high" exposure. Other characteristics of the image frame under consideration and/or of previously-captured image frames 118 also may be considered.

The power determination system 124 can also generate one or more power control signals 126, e.g., to control aspects of the sensor system(s) 104 to implement the determined change in power. For example, the power control signal(s) 126 can instruct a change in voltage and/or current supplied to the emitter 110, can instruct the receiver 112 to alter an integration time, and/or the like. As also illustrated in FIG. 1, the sensor control system 120 can output the power control signal(s) 126 to the sensor system(s) 104, e.g., to the emitter 110 and/or the receiver 112. The sensor system(s) 104 may then generate a next iteration of the sensor data 114 with the sensor system(s) 104 reconfigured according to the power control signal(s) 126. As will be appreciated, dynamically changing the power in accordance with techniques described herein can reduce the number of saturated pixels in subsequent frames. In one example, by dynamically lowering power at a time-of-flight sensor, frames that would be substantially completely saturated, e.g., because of highly reflective and/or close objects, can be improved to reduce saturation, thereby allowing for better recognition of objects. This may be particularly useful in configurations in which the time-of-flight sensor is relied upon to sense objects in close proximity to a vehicle.

Figure 2:
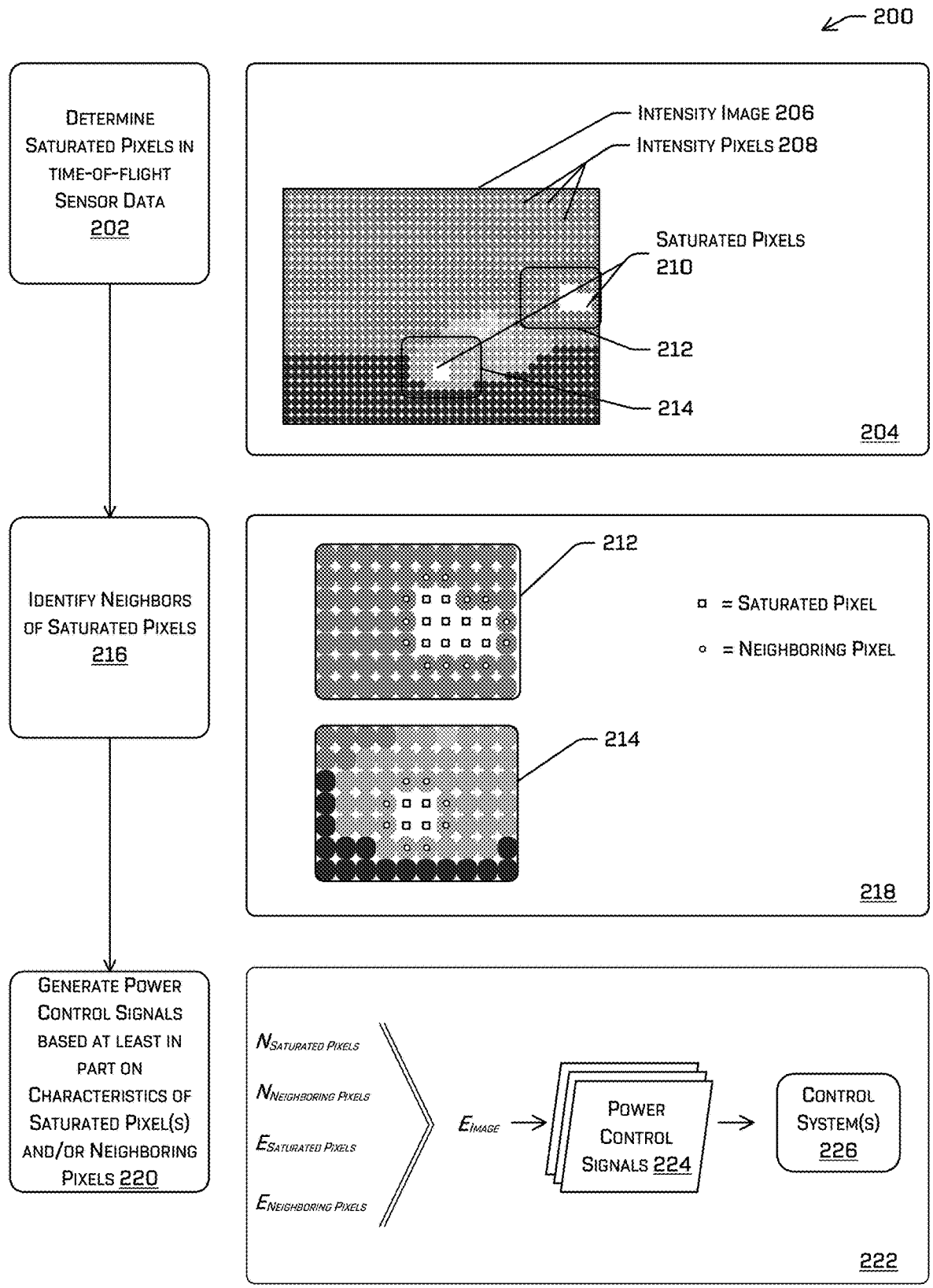
FIG. 2 includes textual and pictorial flowcharts of an example method for active power control of a sensor, such as a time-of-flight sensor, as described herein.

FIG. 2 includes textual and graphical flowcharts illustrative of a process 200 for controlling attributes of a sensor, according to implementations of this disclosure. For example, the process 200 can be implemented using components and systems illustrated in FIG. 1 and described above, although the process 200 is not limited to being performed by such components and systems. Moreover, the components and systems of FIG. 1 are not limited to performing the process 200.

In more detail, the process 200 can include an operation 202 that includes determining saturated pixels in time-of-flight sensor data. As noted above, techniques described herein may be particularly applicable to use with time-of-flight sensors, and the example of FIG. 2 uses time-of-flight sensors as one specific example. The disclosure is not limited to use with time-of-flight sensors, as techniques described herein may be applicable to other types of sensors that may be adversely affected by poor pixel quality, e.g., resulting from overexposure, environmental conditions, or the like, as described herein. In some examples, the operation 202 can first include receiving raw data, e.g., embodied as the phase frames 116, and/or depth and intensity data measured by the time-of-flight sensor, e.g., as the image frames 118.

An example 204 accompanying the operation 202 graphically illustrates the operation 202. In more detail, the example 204 illustrates receiving intensity information, which can be included in, or embodied as, an intensity image 206. As illustrated in the example 204, the intensity image 206 can include a plurality of intensity pixels 208, which represent an intensity (e.g., brightness) of sensed objects in the scene, e.g., on a pixel-by-pixel basis. Although not illustrated in FIG. 2, the time-of-flight sensor data may also include a depth image including depth or range information on the same pixel-by-pixel basis as the intensity image 206. In the representation of the intensity image 206, relatively lighter pixels may represent higher intensity pixels, whereas relatively darker pixels may represent lower intensity. In some examples, a white pixel of the intensity pixels 208 may correspond to an intensity of 1.0 whereas a black pixel of the intensity pixels 208 may correspond to a pixel with an intensity of 0.0. The example 204 specifically identifies the lightest pixels of the intensity pixels 208 as saturated pixels 210. In accordance with examples described herein, the saturated pixels may be identified in a number of ways. For example, the saturated pixels may have a maximum intensity, e.g., an intensity of 1.0. In other examples, the saturated pixels may have an intensity value equal to or above a lower (than the maximum) intensity. In other examples, saturation may be determined from phase values, e.g., used to generate the intensity image 206. Other techniques for determining saturation are described herein, for example, in connection with description of the saturation/neighbor determination component 122 discussed above. A first grouping 212 of the intensity pixels 208, including some of the saturated pixels 210, and a second grouping 214 of the intensity pixels 210, including some of the saturated pixels 210 are reference in the example 204, and are discussed in more detail below.

At an operation 216, the process 200 includes identifying neighbors of the saturated pixels. As detailed further herein, characteristics of pixels neighboring saturated pixels may be useful to determine whether the saturated pixels are a result of the active illumination or ambient light. For instance, saturation due to ambient light does not cause glare, e.g., because the frequency and phase of the light received at the sensor is not the same frequency/phase of the emitted light. In contrast, the active illumination of highly reflective surfaces, e.g., retroreflectors, does cause glare, thereby resulting in increased energy in the surrounding pixels.

An example 218 accompanying the operation 216 schematically illustrates the operation 216 in more detail. More specifically, the example 218 shows the first grouping 212 of the intensity pixels 208 from the intensity image 206 and the second grouping 214 of the intensity pixels 208 from the intensity image 206. As shown in the each of the grouping 212, 214, the saturated pixels are labelled with a rectangle, and the neighboring pixels are labeled with circle. As will be appreciated, in the example 218, the neighboring pixels include pixels that are horizontally adjacent or vertically adjacent one of the saturated pixels. In other examples, diagonally adjacent pixels and/or pixels that are within a threshold number of the pixels, e.g., within two, three or more pixels, may be identified as neighbors of the saturated pixels at the operation 216.

At an operation 220, the process 200 can include generating a power control based at least in part on characteristics of the saturated pixels and/or or the neighboring pixels. An example 222 accompanying the operation 220 illustrates power control signal(s) 224 being transmitted to one or more control systems 226. In this example, the power control signal(s) 224 can be embodied as controls or instructions to an emitter of the sensor and/or a receiver of the sensor. For example, the power control signal(s) 224 can include an instruction to increase or decrease an illumination intensity of the carrier emitted by the emitter, e.g., by increasing or decreasing the current and/or voltage applied to the emitter. Also in examples, the power control signal(s) 224 can include an instruction to increase or decrease an integration time, e.g., a time over which the receiver receives response carriers. Using the example shown in the example 222, the operation 220 may include determining an energy metric, $E_{IMAGE}$, which may be the energy metric E determined according to the Equation (1) discussed above. As also shown in the example 222, the energy metric may be based at least in a number of the saturated pixels, a number of the neighboring pixels, an energy associated with the saturated pixels, e.g., an average energy of the saturated pixels, and/or an energy associated with the neighboring pixels, e.g., an average energy of the neighboring pixels.

In examples described herein, the operation 220 may determine whether and how aspects of the time-of-flight sensor should be reconfigured. For example, when the energy metric meets or exceeds a threshold energy metric, the power control signal 224 may include an instruction to reduce an integration time and/or an illumination power associated with the sensor for subsequent data capture, e.g., because the energy metric is relatively high as a result of the saturation being caused by the active illumination. Lowering the integration time and/or the illumination power may reduce a number of saturated pixels. In this example, the operation 220 can include generating the power control signal(s) 224 that cause the control system(s) 226 to change the power at the sensor. In another example, if the energy metric is relatively low, e.g., below the threshold energy metric, the operation 220 may include generating the power control signal(s) 224 as signals that will cause the control system(s) 226 to increase the power, e.g., to increase the illumination and/or configure the pixels to receive response carriers over a longer period of time. As will be appreciated, longer integration times and/or higher illumination powers may provide higher fidelity data, so long as pixels do not become saturated. Without limitation, the operation 220 can include considering the Equations (2) and (3) to make determinations regarding changes.

In the example of FIG. 2, characteristics of the saturated pixels and/or of the neighboring pixels may be used as indicators that the power should be changed. In other examples, the operation 220 may also or alternatively consider additional information when making a power-change determination. For instance, intensity information, e.g., from the intensity image 206 and/or previous instances of the intensity image 206, information about pixels from previous instances of the intensity image 206, and/or other characteristics may be used to determine whether (and/or how much) the power should be changed, as descried herein. The intensity information may be determined from a histogram associated with the intensity image 314.

Figure 3:
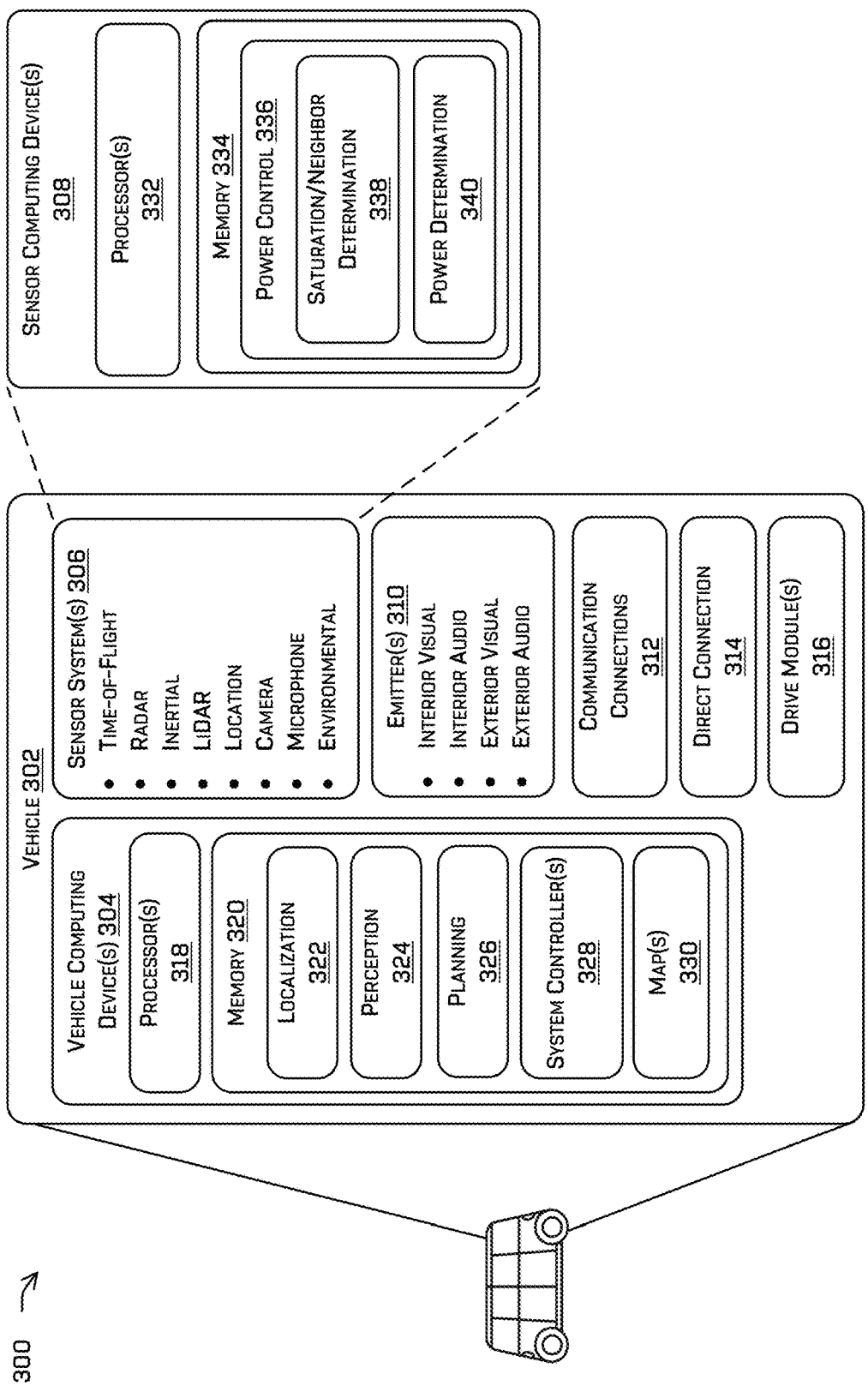
FIG. 3 depicts a block diagram of an example computing system for dynamic power control of a sensor, such as a time-of-flight sensor, as described herein.

FIG. 3 depicts a block diagram of an example system 300 for implementing the techniques discussed herein. In at least one example, the system 300 can include a vehicle 302, which can be similar to (or the same as) the vehicle 102 described above with reference to FIG. 1. In the illustrated example 300, the vehicle 302 is an autonomous vehicle; however, the vehicle 302 can be any other type of vehicle.

The vehicle 302 can include one or more vehicle computing devices 304, one or more sensor systems 306, which may include one or more sensor computing devices 308, one or more emitter(s) 310, one or more communication connections 312, at least one direct connection 314 (e.g., for physically coupling with the vehicle 302 to exchange data and/or to provide power), and one or more drive modules 316. In some instances, the vehicle 302 can include more or fewer instances of the vehicle computing device(s) 304. The sensor system(s) 306 can be configured to capture sensor data associated with an environment. In examples, the sensor system(s) 306 can include the sensor system(s) 104 and/or the time-of-flight sensor(s) 208.

The vehicle computing device(s) 304 can include one or more processors 318 and memory 320 communicatively coupled with the one or more processors 318. In at least one instance, the processor(s) 318 can be similar to the processor(s) 106 and the memory 320 can be similar to the memory 108 described above with reference to FIG. 1. In the illustrated example, the memory 320 of the vehicle computing device(s) 304 stores a localization component 322, a perception component 324, a planning component 326, one or more system controllers 328, and one or more maps 330. Though depicted as residing in the memory 320 for illustrative purposes, it is contemplated that the localization component 322, the perception component 324, the planning component 326, and/or the system controller(s) 328 can additionally, or alternatively, be accessible to the vehicle computing device(s) 304 (e.g., stored in a different component of vehicle 302 and/or stored remotely).

In at least one example, the localization component 322 can include functionality to receive data from the sensor system(s) 306 to determine a position of the vehicle 302. In examples, received data can include a depth image and/or an intensity image. In other implementations, the localization component 322 can include and/or request/receive a three-dimensional map, e.g., of the map(s) 330 of an environment and can continuously determine a location of the autonomous vehicle within the map. In some instances, the localization component 322 can use SLAM (simultaneous localization and mapping) or CLAMS (calibration, localization and mapping, simultaneously) to receive image data, such as from the time-of-flight sensor, LiDAR data, RADAR data, SONAR data, IMU data, GPS data, wheel encoder data, or any combination thereof, and the like to accurately determine a location of the autonomous vehicle 302. In some instances, the localization component 322 can provide data to various components of the vehicle 302 to determine an initial position of an autonomous vehicle for generating a candidate trajectory, as discussed herein.

In some examples, the perception component 324 can include functionality to perform object detection, segmentation, and/or classification. In some examples, the perception component 324 can receive data and generate processed sensor data that indicates a presence of an object in the environment of, e.g., proximate, the vehicle 302 and/or a classification of the object as an object type (e.g., car, pedestrian, cyclist, building, tree, road surface, curb, sidewalk, unknown, etc.). In additional and/or alternative examples, the perception component 324 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc.

In some instances, the planning component 326 can determine a path for the vehicle 302 to follow to traverse through an environment. For example, the planning component 326 can determine various routes and trajectories and various levels of detail. In some examples, the planning component 326 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 326 can generate an instruction for guiding the autonomous vehicle along at least a portion of the route from the first location to the second location. In at least one example, the planning component 326 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 326 can alternatively, or additionally, use data from the perception component 324 to determine a path for the vehicle 302 to follow to traverse through an environment. For example, the planning component 326 can receive data from the perception component 324 regarding objects associated with an environment. Using this data, the planning component 326 can determine a route to travel from a first location (e.g., a current location) to a second location (e.g., a target location) to avoid objects in an environment.

As noted above, the vehicle computing device(s) 304 can include the system controller(s) 328, which can be configured to control steering, propulsion, braking, safety systems, emitters, communication systems, and/or other systems of the vehicle 302. The system controller(s) 328 can communicate with and/or control corresponding systems of the drive module(s) 316 and/or other components of the vehicle 302, which may be configured to operate in accordance with a trajectory provided from the planning component 326.

In some examples, the map(s) 330 can be stored on a remote computing device. Multiple maps 330 can be stored based on, for example, a characteristic (e.g., type of entity, time of day, day of week, season of the year, etc.). Storing multiple maps 330 can have similar memory requirements, but increase the speed at which data in a map can be accessed.

In at least one example, the sensor system(s) 306 can be similar to the sensor system(s) 104 described above with reference to FIG. 1. The sensor system(s) 306 can include time-of-flight sensors, location sensors (e.g., GPS, compass, etc.), inertial sensors (e.g., inertial units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 306 can include multiple instances of each of these or other types of sensors. For instance, the time-of-flight sensors can include individual time-of-flight sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device(s) 304.

The sensor system(s) 306 can include the sensor computing device(s) 308, which can include one or more processors 332 and memory 334 communicatively coupled with the one or more processors 332. The one or more processors 332 can be similar to, or the same as, the processor(s) 106 and/or to the processor(s) 318, described above. Moreover, the memory 334 can be similar to, or the same as, the memory 108 and/or to the memory 320, described above. In the illustrated example, the memory 334 of the sensor computing device(s) 308 can store a power control system 336, which can include a saturation/neighbor determination component 338 and a power determination component 340. Though depicted as residing in the memory 334 for illustrative purposes, it is contemplated that the power control system 336 (as well as its associated components) can additionally, or alternatively, be accessible to the sensor system(s) 306 (e.g., stored in a different component of vehicle 302 and/or stored remotely). Moreover, although the power control system 336 (as well as its associated components) is illustrated as being stored in and/or part of the sensor computing device(s) 308, in other implementations any or all of these components may be stored in the memory 320 and/or in some other, not illustrated memory, such as a remote memory associated with a remote computing device. That is, although FIG. 3 illustrates several components as being part of the sensor computing device(s) 308 of the sensor system(s) 306, the processing associated with any or all of those components may be performed other than at the sensor. In one example, the sensor system(s) 306 may output raw data, e.g., the quadrature data discussed above, for processing in accordance with functionality ascribed herein to one or more of the power control system 336, the saturation/neighbor determination component 338, and/or the power determination component 340, but that processing may be performed other than at the location of the emitter and the receiver. Without limitation, the sensor system(s) 306 can include on-board processing capabilities to perform any or all functionality described herein and associated with performing active power control at the sensor system(s) 306. Alternatively, processing of the sensor data may be performed other than at the sensor system(s) 306.

The sensor computing device(s) 308, including the power control system 336, may be configured to generate and/or process data in many formats. For example, and as noted above, the sensor computing device(s) 308 can measure a phase shift between the carrier and the response carrier and/or perform numerical integration calculations to determine the sensor data in the quadrature format. In other examples, the sensor computing device(s) 308 can determine an intensity and/or depth format of the sensor data, e.g., generate the depth and/or intensity images as described herein. For purposes of illustration only, the sensor system(s) 306 can determine the sensor data in the intensity and depth format where an individual pixel in the sensor data is associated with an 8-bit value for the intensity and a 12-bit value for the depth.

The power control system 336 can be configured to receive sensor data generated by the sensor system(s) 306, e.g., by a time-of-flight senor, and generate controls to alter aspects of the sensor system(s) 306, e.g., to improve subsequent returns. In examples described herein, adjusting power, e.g., illumination intensity and/or integration time, can result in better, e.g., more reliable, sensor data. For example, and as detailed herein, data generated by time-of-flight sensors can include saturated pixels that cannot be reliably used to determine depths of sensed surfaces. Reducing the number of saturated pixels can provide down-stream systems with improved data. In examples described herein, pixel saturation can be particularly problematic in implementations in which a distance to objects in the environment is required, e.g., to safely travel through an environment relative to such objects.

The saturation/neighbor determination component 338 can determine attributes and/or classifications of pixels in image data, e.g., on a per-pixel basis. The saturation/neighbor determination component 338 can correspond to the saturation/neighbor determination component 122 detailed above. For example, the saturation/neighbor determination component 338 can include functionality to determine or identify saturated pixels and pixels neighboring the saturated pixels. As described in connection with FIGS. 1 and 2, the saturation/neighbor determination component 338 may make these determinations using any of a number of techniques, including based on intensity information and/or phase value information.

The power determination component 340 can determine a power change based on the saturated pixels and neighboring pixels. The power determination component 340 can correspond to the power determination component 124 detailed further herein. For example, the power determination component 340 can determine a power change for the sensor based at least in part on the number of saturated pixels, an energy value associated with the saturated pixels, the number of neighboring pixels, an energy value associated with the neighboring pixels, and/or other characteristics. As described further herein, the power determination component 340 may determine an energy metric using the saturated pixels and/or the neighboring pixels, and the energy metric may be used to determine whether and how to reconfigure aspects of the sensor to generate additional sensor data. Other details of the power determination component 340 are described herein.

The emitter(s) 310 are configured for emitting light and/or sound, as described above. In the illustrated example, the emitter(s) 310 can include interior visual and/or interior audio emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 310 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 312 enable communication between the vehicle 302 and one or more other local or remote computing device(s), including the sensor computing device(s) 308. For instance, the communication connection(s) 312 can facilitate communication with other local computing device(s) on the vehicle 302 and/or the drive module(s) 316. Also, the communication connection(s) 312 can allow the vehicle to communicate with other nearby computing device(s) (e.g., other nearby vehicles, traffic signals, etc.). The communications connection(s) 312 can also enable the vehicle 302 to communicate with a remote teleoperations computing device or other remote services.

The communications connection(s) 312 can include physical and/or logical interfaces for connecting the vehicle computing device(s) 304 to another computing device or an external network (e.g., the Internet). For example, the communications connection(s) 312 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the drive module(s) 316 can include a single drive module 316. In other examples, the vehicle 302 can have multiple drive modules, and individual drive modules 316 can be positioned on opposite ends of the vehicle 302 (e.g., the front and the rear, etc.). In at least one example, the drive module(s) 316 can include one or more sensor systems to detect conditions of the drive module(s) 316 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 316. In some cases, the sensor system(s) on the drive module(s) 316 can overlap or supplement corresponding systems of the vehicle 302 (e.g., the sensor system(s) 306).

The drive module(s) 316 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 316 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 316. Furthermore, the drive module(s) 316 also include one or more communication connection(s) that enable communication by the respective drive module with one or more other local or remote computing device(s).

The processor(s) 318 of the vehicle 302, the processor(s) 332 of the sensor computing device(s) 308, and/or the processor(s) 106 of the sensor system(s) 104 can be any suitable processor capable of executing instructions to process data and perform operations as described herein. By way of example and not limitation, the processor(s) 318, 332, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 320, 334, 108 are examples of non-transitory computer-readable media. The memory 320, 334, 108 can store an operating system and one or more software applications, instructions, programs, and/or data to implement the methods described herein and the functions attributed to the various systems. In various implementations, the memory 320, 334, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 320, 334, 108 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 4:
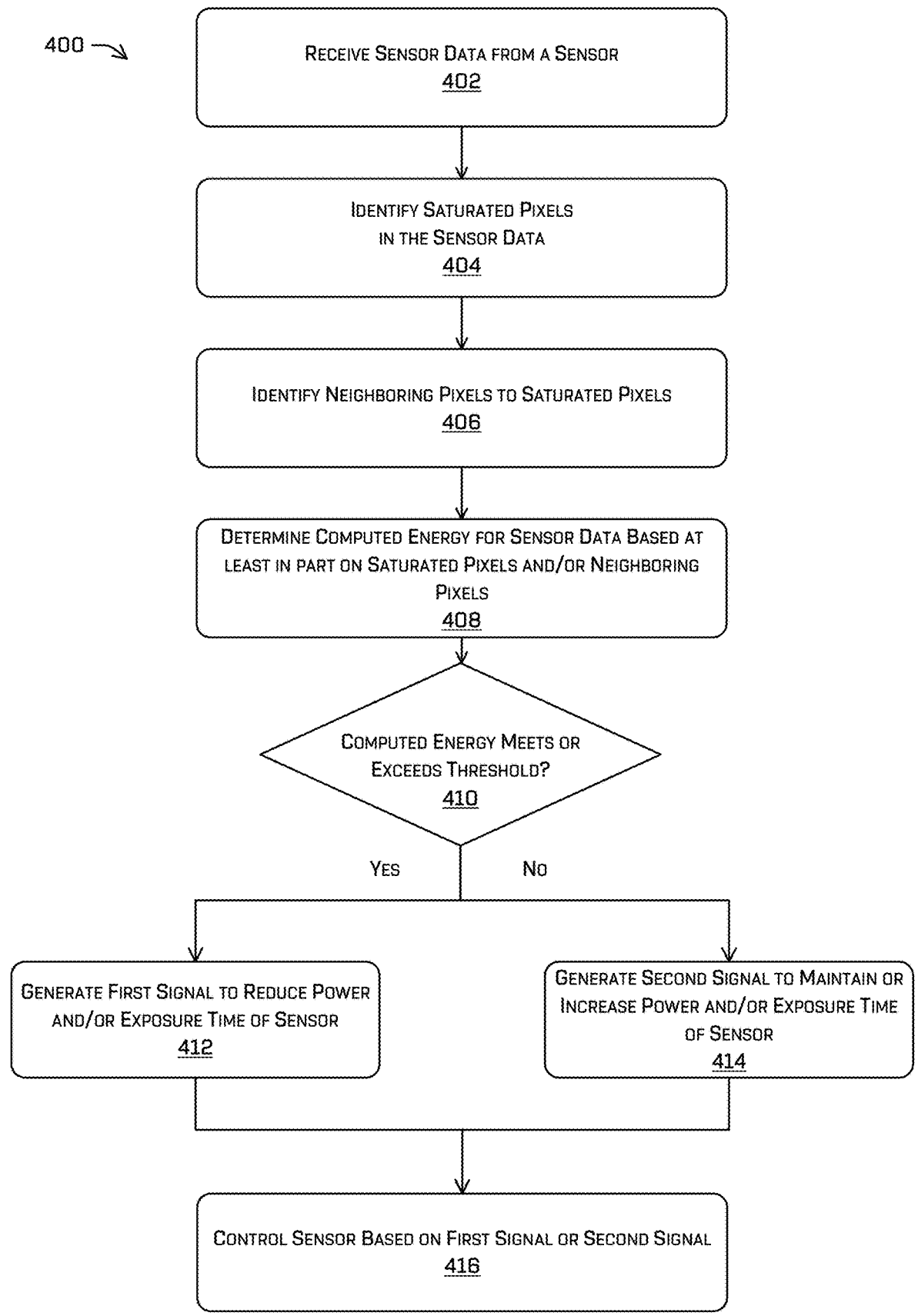
FIG. 4 is a flowchart illustrating an example method for dynamic power control in a sensor, such as a time-of-flight sensor, as described herein.
Figure 5:
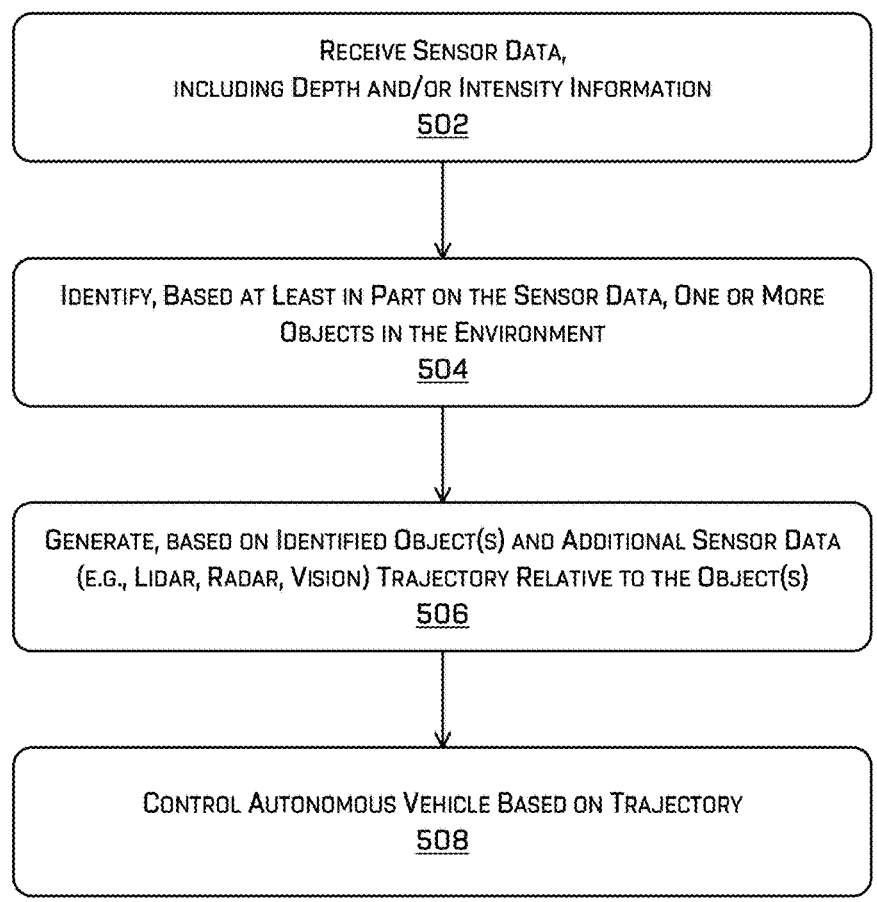
FIG. 5 is a flowchart illustrating an example method for controlling a vehicle relative to obstacles sensed by a sensor, such as a time-of-flight sensor, as described herein.

FIGS. 4 and 5 (and portions of FIG. 2, discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 4 depicts an example process 400 for dynamic power control of a sensor system, such as a time-of-flight sensor. For example, some or all of the process 400 can be performed by the sensor system(s) 104 and/or by one or more components illustrated in FIG. 3, as described herein. For example, some or all of the process 400 can be performed by the sensor computing device(s) 308 of the sensor system(s) 306, including, but not limited to, the saturation/neighbor determination component 338 and/or the power determination component 340. However, the process 400 is not limited to being performed by these components, and the components are not limited to performing the process 400.

At an operation 402, the process 400 includes receiving sensor data from a sensor. For example, techniques described herein may be useful for active control of a time-of-flight sensor based on sensor data received from the time-of-flight sensor. In these examples, the time-of-flight sensor may generate raw data, e.g., embodied as phase frames, and/or processed image data, e.g., an intensity image describing intensities for the individual measured pixels.

At operation 404, the process 400 can include determining a number of saturated pixels in the sensor data. For instance, and as described herein, a pixel can be saturated when an intensity thereof meet or exceeds a threshold intensity, e.g., a maximum intensity value. In other examples, a pixel can be saturated when phase frame information associated therewith fails to meet a certain characteristic or property. In some instances, the sensor may include processors and/or functionality to determine saturated pixels, and may flag or otherwise identify saturated pixels, as also described herein. Also in examples, the operation 404 may determine the number of saturated pixels for the image.

At an operation 406, the process 400 can include identifying neighboring pixels to the saturated pixels. For instance, the operation 406 can include identifying non-saturated pixels that are adjacent the saturated pixels. For instance, the neighboring pixels may be horizontally- or vertically-adjacent to the saturated pixels determined at the operation 404.

At an operation 408, the process 400 can include determining a computed energy for the sensor data based at least in part on the saturated pixels and/or the neighboring pixels. In some examples, the operation 408 can include solving the equation (1) discussed above to calculate the energy metric, E. For instance, the energy metric may be based at least in part on a number of the saturated pixels, a number of the neighboring pixels, an energy associated with the saturated pixels, e.g., an average energy of the saturated pixels, and/or an energy associated with the neighboring pixels, e.g., an average energy of the neighboring pixels.

At an operation 410, the process 400 can include determining whether the computed energy meets or exceeds a threshold energy. For example, the operation 410 can compare the energy metric, E, to a threshold energy metric. In the example discussed above in connection with equation (1), the threshold energy metric may be 0.1, although this is for example only.

If, at the operation 410, it is determined that the computed energy for the sensor data meets or exceeds the threshold, at an operation 412 the process 400 can include generating a first signal to reduce power and/or exposure time of the sensor. For instance, a relatively high computed energy may result from a large number of saturated pixels and/or a high energy associated with glare, and the operation 412 can determine new sensor parameters to reduce the number of saturated pixels in subsequently-generated sensor data. In some examples, the operation 412 can include determining a shorter exposure time using the equation (2) discussed above.

Alternatively, if at the operation 410 it is determined that the computed energy is below the threshold, at an operation 414 the process 400 can include generating a second signal to maintain or increase power and/or exposure time of the sensor. For instance, a relatively low computed energy may indicate very or no saturated pixels, e.g., resulting in relatively reliable sensor data. In some examples, the operation 414 can maintain the current sensor configuration or can incrementally increase the exposure time and/or the power, e.g., to attempt to increase fidelity of subsequently-captured sensor data. Without limitation, the operation 414 can include determining a longer exposure time using the equation (3) discussed above.

At an operation 512, the process 500 can also include controlling the sensor based on the first signal or the second signal. For example, the first signal may cause a first reconfiguration of the sensor that includes first changes to aspects of an emitter and/or a receiver of the time-of-flight sensor. The second signal may a second reconfiguration of the sensor that includes second changes to aspects of the emitter and/or the receiver. Accordingly, subsequent image data can be captured with the sensor adjusted to improve data capture.

FIG. 5 depicts an example process 500 for controlling an autonomous vehicle relative to objects in an environment, as discussed herein. For example, some or all of the process 500 can be performed by the vehicle 102 of FIG. 1 and/or the vehicle 302 and its related components illustrated in and discussed with reference to FIG. 3. For example, some or all of the process 500 can be performed by the localization component 322, the perception component 324, the planning component 426, and/or the one or more system controllers 428.

At an operation 502, the process 500 can include receiving sensor data, including depth and/or intensity information. The sensor data may include a depth image and an intensity image containing per-pixel range and intensity values, for example. The sensor data may be received from the time-of-flight sensor on a frame-by-frame basis, e.g., the sensor system may output data comprising a first frame (which includes both the depth image and the intensity image), a second frame, etc. In examples, the frames may be generated with varied sensor parameters, as described herein. For example, the sensor may be reconfigured based on characteristics of saturated pixels and/or neighboring pixels of the saturated pixels. In still further embodiments the sensor data may be a representation of the environment, e.g., an image of the environment, generated using data from the time-of-flight sensor and/or data generated based on the data from the time-of-flight sensor.

At operation 504, the process 500 can include identifying, based at least in part on the filtered sensor data, one or more objects in the environment. For example, the localization component 322 and/or the perception component 324 may receive the depth and/or intensity data at 502 and identify objects in the environment. For example, the vehicle computing device(s) 304 may classify objects based on the sensor data and map the objects in the environment relative to the vehicle 302, e.g., using one or more maps like the map(s) 330. For instance, the depth and/or intensity information may be used, either alone or in combination with other data, to determine one or more bounding boxes, such as three-dimensional bounding boxes, representative of the sensed objects.

At operation 506, the process 500 can include generating, based on the identified object(s) and additional sensor data (e.g., LiDAR data, radar data, vision data), a trajectory relative to the object(s). For example, the planning component 326 of the vehicle computing device(s) 304 can further determine relative movement, e.g., velocity and acceleration, of the objects in the environment using one or more sensor modalities, object classification data, and the maps 330 and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like.

At operation 508, the process 500 can include controlling an autonomous vehicle to follow the trajectory. In some instances, the operation 508 can include generating commands that can be relayed to a controller onboard an autonomous vehicle to control the autonomous vehicle to drive the travel path. Although discussed in the context of an autonomous vehicle, the process 500, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: a time-of-flight sensor; one or more processors; and memory storing processor-executable instructions that, when executed by the one or more processors, configure the vehicle to perform actions comprising: receiving sensor data from the time-of-flight sensor, the sensor data comprising a plurality of phase frames comprising phase values for a plurality of pixels; determining, based at least in part on the phase values for the plurality of pixels, saturated pixels of the plurality of pixels; determining neighboring pixels of the plurality of pixels, the neighboring pixels being non-saturated pixels adjacent at least one of the saturated pixels; generating, based at least in part on one or more characteristics of the neighboring pixels, a signal to alter at least one of an illumination intensity or an integration time associated with the time-of-flight sensor; and sending the signal to the time-of-flight sensor.

B: The vehicle of example A, wherein the one or more characteristics of the neighboring pixels comprise at least one of a quantity of the neighboring pixels, an average energy of the neighboring pixels, or a total energy of the neighboring pixels.

C: The vehicle of example A or example B, wherein the generating the signal is further based at least in part on one or more of a quantity of the saturated pixels, an average energy of the saturated pixels, or a total energy of the saturated pixels.

D: The vehicle of any one of example A through example C, the actions further comprising: determining an energy metric associated with the sensor data, the energy metric being based at least in part on one or more of a number of the neighboring pixels, an average energy of the neighboring pixels, a number of the saturated pixels, or an average energy of the saturated pixels.

E: The vehicle of any one of example A through example D, wherein the generating the signal comprises at least one of: generating, in response to the energy metric being equal to or above a threshold energy metric, a first signal to at least one of decrease the illumination intensity or decrease the integration time; or generating, in response to the energy metric being below the threshold energy metric, a second signal to at least one of increase the illumination intensity or increase the integration time.

F: The vehicle of any one of example A through example E, the actions further comprising: receiving, from the time-of-flight sensor with an altered illumination intensity or an altered integration time based on the signal, second sensor data; determining, based at least in part on the second sensor data, information about an object in an environment of the vehicle; determining a trajectory through the environment relative to the object; and controlling the vehicle to travel along the trajectory.

G: An example method includes: receiving sensor data from a time-of-flight sensor; determining saturated pixels in the sensor data; identifying neighboring pixels in the sensor data, the neighboring pixels comprising pixels adjacent one of the saturated pixels; and generating, based at least in part on one or more characteristics of the neighboring pixels, a signal to change a sensing parameter of the time-of-flight sensor.

H: The method of example G, further comprising: determining an energy metric associated with the sensor data, the energy metric being based at least in part on one or more of a number of the neighboring pixels or an average energy of the neighboring pixels.

I: The method of example G or example H, wherein the generating the signal comprises one of: generating, in response to the energy metric being equal to or above a threshold energy metric, the signal comprises a first signal to at least one of decrease an illumination intensity of an emitter of the time-of-flight sensor or decrease an integration time of a receiver of the time-of-flight sensor; or in response to the energy metric being below the threshold energy metric, the signal comprises a second signal to at least one of increase the illumination intensity or increase the integration time.

J: The method of any one of example G through example I, wherein the energy metric is further based at least in part on a number of the saturated pixels or an average energy of the saturated pixels.

K: The method of any one of example G through example J, wherein individual of the neighboring pixels are horizontally adjacent or vertically adjacent one of the saturated pixels.

L: The method of any one of example G through example K, wherein: the sensor data comprises a plurality of phases; and the determining the saturated pixels comprises determining a pixel to be a saturated pixel based at least in part on a sum of a plurality of phase values associated with the pixel equaling other than substantially zero.

M: The method of any one of example G through example L, wherein: the sensor data comprises a plurality of phase frames; and the determining the saturated pixels comprises determining a pixel to be a saturated pixel when a phase value associated with the pixel meets or exceeds a threshold value.

N: The method of any one of example G through example M, further comprising: altering, based at least in part on the signal, the sensing parameter of the time-of-flight sensor; and receiving additional data from the time-of-flight sensor.

O: The method of any one of example G through example N, wherein the signal comprises a signal to alter at least one of an illumination intensity of an emitter of the time-of-flight sensor or an integration time of a receiver of the time-of-flight sensor.

P: An example system includes: one or more processors; and computer-readable storage media storing instructions executable by the one or more processors to perform operations comprising: receiving sensor data generated by a time-of-flight sensor; determining saturated pixels in the sensor data; determining neighboring pixels proximate the saturated pixels; determining, based at least in part on the neighboring pixels, a configuration for the time-of-flight sensor; and causing the time-of-flight sensor to be configured in the configuration.

Q: The system of example P, wherein: the determining the configuration is based at least in part on one or more of a number of the neighboring pixels or an energy associated with the neighboring pixels.

R: The system of example P or example Q, the operations further comprising: determining, based at least in part on one or more characteristics of the neighboring pixels, an energy metric associated with the sensor data, wherein the determining the configuration is based at least in part on the energy metric.

S: The system of any one of example P through example R, wherein the determining the configuration comprises: determining, in response to the energy metric being equal to or above a threshold energy metric, the configuration to be a first configuration including at least one of a decreased illumination intensity of an emitter of the time-of-flight sensor or a decreased integration time of a receiver of the time-of-flight sensor; or determining, in response to the energy metric being below the threshold energy metric, the configuration to be a second configuration including at least one of an increased illumination intensity or an increased integration time.

T: The system of any one of example P through example S, wherein individual of the neighboring pixels are horizontally adjacent or vertically adjacent one of the saturated pixels.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
a time-of-flight sensor;
one or more processors; and
memory storing processor-executable instructions that, when executed by the one or more processors, configure the vehicle to perform actions comprising:
receiving sensor data from the time-of-flight sensor, the sensor data comprising a plurality of phase frames comprising phase values for a plurality of pixels;
determining, based at least in part on the phase values for the plurality of pixels, saturated pixels of the plurality of pixels;
determining neighboring pixels of the plurality of pixels, the neighboring pixels being non-saturated pixels adjacent at least one of the saturated pixels;
determining an energy metric associated with the sensor data, the energy metric being based at least in part on one or characteristics of the neighboring pixels;
generating, based at least in part on the energy metric, a signal to alter at least one of an illumination intensity or an integration time associated with the time-of-flight sensor; and
sending the signal to the time-of-flight sensor.

2. The vehicle of claim 1, wherein the one or more characteristics of the neighboring pixels comprise at least one of a quantity of the neighboring pixels, an average energy of the neighboring pixels, or a total energy of the neighboring pixels.

3. The vehicle of claim 1, wherein the generating the signal is further based at least in part on one or more of a quantity of the saturated pixels, an average energy of the saturated pixels, or a total energy of the saturated pixels.

4. The vehicle of claim 1, wherein the determining the energy metric is further based at least in part on a number of the saturated pixels or an average energy of the saturated pixels.

5. The vehicle of claim 4, wherein the generating the signal comprises at least one of:
generating, in response to the energy metric being equal to or above a threshold energy metric, a first signal to at least one of decrease the illumination intensity or decrease the integration time; or generating, in response to the energy metric being below the threshold energy metric, a second signal to at least one of increase the illumination intensity or increase the integration time.

6. The vehicle of claim 1, the actions further comprising:
receiving, from the time-of-flight sensor with an altered illumination intensity or an altered integration time based on the signal, second sensor data;
determining, based at least in part on the second sensor data, information about an object in an environment of the vehicle;
determining a trajectory through the environment relative to the object; and
controlling the vehicle to travel along the trajectory.

7. A method comprising:
receiving sensor data from a time-of-flight sensor;
determining saturated pixels in the sensor data;
identifying neighboring pixels in the sensor data, the neighboring pixels comprising pixels adjacent one of the saturated pixels;
determining, based at least in part on one or more characteristics of the neighboring pixels, an energy metric associated with the sensor data;
generating, based at least in part on the energy metric, a signal to change a sensing parameter of the time-of-flight sensor; and
altering, based at least in part on the signal, the sensing parameter of the time-of-flight sensor.

8. The method of claim 7, wherein:
the energy metric is based at least in part on one or more of a number of the neighboring pixels or an average energy of the neighboring pixels.

9. The method of claim 8, wherein the generating the signal comprises one of:
generating, in response to the energy metric being equal to or above a threshold energy metric, the signal comprises a first signal to at least one of decrease an illumination intensity of an emitter of the time-of-flight sensor or decrease an integration time of a receiver of the time-of-flight sensor; or
in response to the energy metric being below the threshold energy metric, the signal comprises a second signal to at least one of increase the illumination intensity or increase the integration time.

10. The method of claim 7, wherein the energy metric is further based at least in part on a number of the saturated pixels or an average energy of the saturated pixels.

11. The method of claim 7, wherein individual of the neighboring pixels are horizontally adjacent or vertically adjacent one of the saturated pixels.

12. The method of claim 7, wherein:
the sensor data comprises a plurality of phases; and
the determining the saturated pixels comprises determining a pixel to be a saturated pixel based at least in part on a sum of a plurality of phase values associated with the pixel equaling other than zero.

13. The method of claim 7, wherein:
the sensor data comprises a plurality of phase frames; and
the determining the saturated pixels comprises determining a pixel to be a saturated pixel when a phase value associated with the pixel meets or exceeds a threshold value.

14. The method of claim 7, further comprising:
receiving, in response to altering the sensing parameter of the time-of-flight sensor, additional data from the time-of-flight sensor.

15. The method of claim 7, wherein the signal comprises a signal to alter at least one of an illumination intensity of an emitter of the time-of-flight sensor or an integration time of a receiver of the time-of-flight sensor.

16. A system comprising:
one or more processors; and
computer-readable storage media storing instructions executable by the one or more processors to perform operations comprising:
receiving sensor data generated by a time-of-flight sensor;
determining saturated pixels in the sensor data;
determining neighboring pixels proximate the saturated pixels;
determining, based at least in part on one or more characteristics of the neighboring pixels, an energy metric associated with the sensor data;
determining, based at least in part on the energy metric, a configuration for the time-of-flight sensor; and
causing the time-of-flight sensor to be configured in the configuration.

17. The system of claim 16, wherein:
the determining the configuration is based at least in part on one or more of a number of the neighboring pixels or an energy associated with the neighboring pixels.

18. The system of claim 16, wherein the determining the configuration comprises:
determining, in response to the energy metric being equal to or above a threshold energy metric, the configuration to be a first configuration including at least one of a decreased illumination intensity of an emitter of the time-of-flight sensor or a decreased integration time of a receiver of the time-of-flight sensor; or
determining, in response to the energy metric being below the threshold energy metric, the configuration to be a second configuration including at least one of an increased illumination intensity or an increased integration time.

19. The system of claim 16, wherein individual of the neighboring pixels are horizontally adjacent or vertically adjacent one of the saturated pixels.

20. The system of claim 16, wherein the energy metric is further based at least in part on a number of the saturated pixels or an average energy of the saturated pixels.

* * * * *